United States Patent [19]

Heyer et al.

[11] 4,376,472
[45] Mar. 15, 1983

[54] CYLINDER PISTON DEVICE

[75] Inventors: Günter Heyer, Schweinfurt; Günther Handke, Euerbach; Joachim Kopic, Schweinfurt, all of Fed. Rep. of Germany

[73] Assignee: Fichtel and Sachs AG, Schweinfurt, Fed. Rep. of Germany

[21] Appl. No.: 241,140

[22] Filed: Mar. 6, 1981

[30] Foreign Application Priority Data

Mar. 7, 1980 [DE] Fed. Rep. of Germany ....... 3008708

[51] Int. Cl.³ .............................................. F16F 9/32
[52] U.S. Cl. .................. 188/322.22; 92/248; 92/249
[58] Field of Search ................... 92/212, 248, 249; 188/322.13, 322.15, 322.18, 322.22

[56] References Cited

U.S. PATENT DOCUMENTS

| 3,109,520 | 11/1963 | Vossieck | 188/322.22 X |
| 3,724,615 | 4/1973 | Stormer | 188/322.22 X |
| 3,730,305 | 5/1973 | Fouts | 92/248 X |

FOREIGN PATENT DOCUMENTS 7725888 12/1977 Fed. Rep. of Germany .
2716927 10/1978 Fed. Rep. of Germany .

*Primary Examiner*—Duane A. Reger
*Attorney, Agent, or Firm*—Toren, McGeady and Stanger

[57] ABSTRACT

In a cylinder piston device, a piston unit is fixed to a piston rod member within a cavity defined by a cylinder member. The piston unit is provided with a piston ring supporting face, which is directed substantially in a radially outward direction towards the inner circumferential surface of the cylinder member. A piston ring member with a radially inner circumferential face and a radially outer circumferential face is supported by its radially inner circumferential face on said piston ring supporting face and engages by its radially outer circumferential face the inner circumferential surface of the cylinder member. The piston ring member is provided with at least one radially inward directed projection extending in the radially inward direction beyond the radially inner circumferential face, the projection axially engaging a securing face of the piston unit, and the securing face extending radially inward of the piston ring supporting face.

26 Claims, 6 Drawing Figures

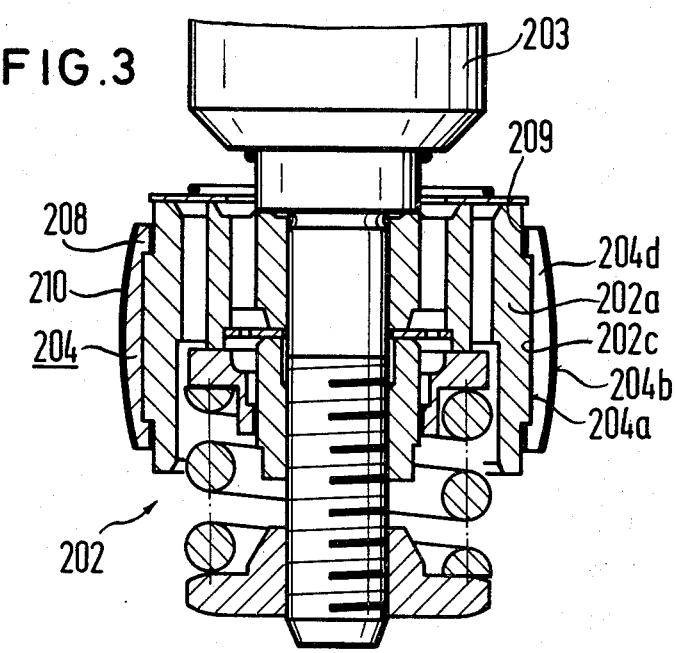
FIG. 3
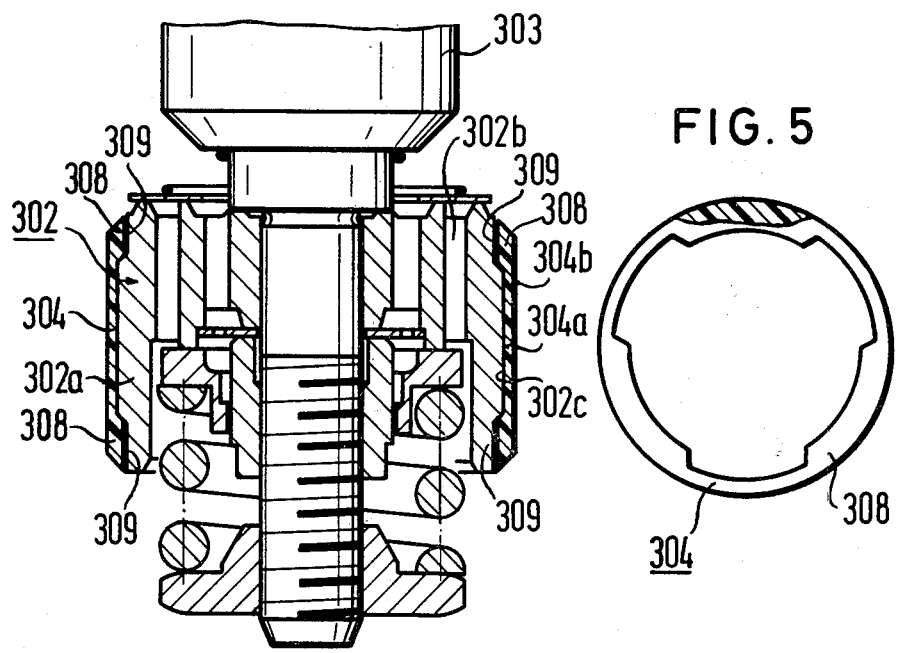
FIG. 4
FIG. 5

CYLINDER PISTON DEVICE

SUMMARY OF THE INVENTION

The present invention is directed to a cylinder piston device, particularly for use as part of a shock absorber of a vehicle or as part of a spring suspension unit of a vehicle. In the present invention, the cylinder piston device includes a cylinder member having an axis and two ends and defining a cavity therein. A piston rod unit is axially movable with respect to the cylinder member. The piston rod unit comprises a piston rod member. A portion of the piston rod member is always housed within the cavity. A piston unit is fixed to the portion of the piston rod member which is within the cavity. The piston unit defines two working chambers within the cavity. The working chambers are interconnected by throttled fluid connection means. The piston unit is provided with a piston ring supporting face which is directed substantially in a radially outward direction towards an inner circumferential face of the cylinder member. A piston ring member with a radially inner circumferential face and a radially outer circumferential face is supported by its radially inner circumferential face on the piston ring supporting face and engages by its radially outer circumferential face the inner circumferential surface of the cylinder member.

The axial length of the piston ring member is preferably considerably greater than the radial thickness of the piston ring member. The piston ring member is axially fixed with respect to the piston unit. A fluid is contained within the working chambers.

Such cylinder piston devices are known e.g. from German Gebrauchsmuster No. 77 25 888 or from German Offenlegungsschrift No. 27 16 927.

In the known devices the piston unit is provided with an annular groove which annular groove has an axial length corresponding to the axial length of the piston ring member. It is further known to provide a non-metallic anti-friction layer onto the piston unit so that this anti-friction layer is fixed to the piston unit. Manufacturing and assembling is relatively difficult and expensive with these known spring devices. Further it has been found that in use of this type of cylinder piston devices in connection with shock absorbers on increased damping action the temperature is considerably increased. As a result thereof piston ring members of plastic material are subject to considerable thermal expansion. As a consequence thereof there is a risk of wrong operation. It may happen that on increased temperature, the piston unit is clamped with respect to the cylinder member or that the piston ring member is plastically deformed. On the other hand at lower operational temperatures the sealing action of the piston ring member may become insufficient. It is always difficult to select the material of the piston ring member such that all these situations of wrong operation can be avoided.

It is the primary object of the present invention to provide a cylinder piston device of the type described above in which the piston ring member can be easily mounted on the piston unit. A further object is to provide the piston unit with a piston ring member of operational reliability. A further object is to provide a cylinder piston device, in which the piston unit including the piston ring member is capable to transmit radial forces between the piston rod member and the cylinder member.

In accordance with the present invention the piston ring member is provided with at least one radially inward directed projection extending in the radially inward direction beyond the radially inner circumferential face of the piston ring member, the projection axially engaging a securing face of the piston unit, the securing face extending radially inward of said piston ring supporting face.

With this construction the piston ring member can expand in the axial direction on variation of the temperature because it is not further necessary to provide axially directed abutment faces for the respective axial ends of the piston ring member in order to secure the piston ring member in axial direction. Due to this possibility of axial expansion the wear of the piston ring member is substantially reduced and on the other hand the piston ring member can be dimensioned in such a way that without risk of blocking at increased temperature the sealing action remains sufficient at lower temperatures.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 3 is a sectional view of a third embodiment of a piston unit for a cylinder piston device of this invention;

FIG. 4 is a sectional view of a fourth embodiment of a piston unit for a cylinder piston device of this invention;

FIG. 5 is an end view partially in section of the piston ring member of the piston unit of FIG. 4.

DETAILED DESCRIPTION OF THE INVENTION

Figure 1:
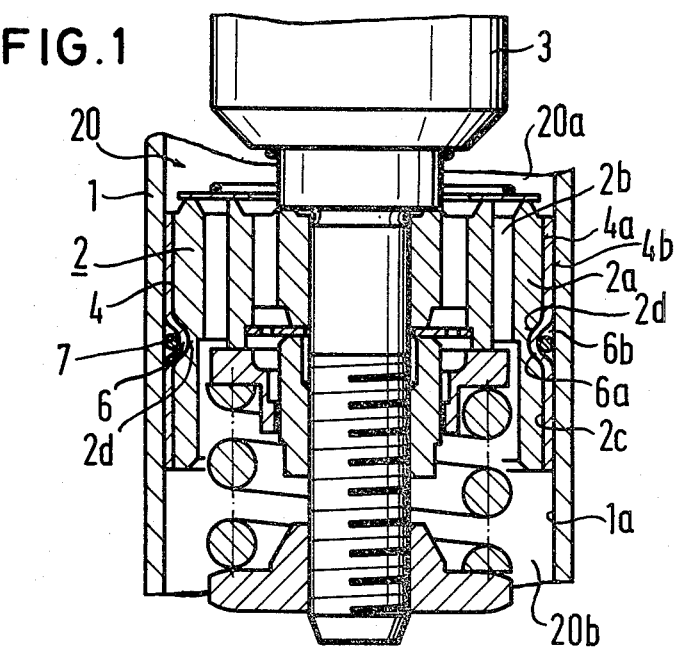
FIG. 1 is an axially extending section through a cylinder piston device incorporating the present invention.

FIG. 1 shows a cylinder piston device of this invention forming a part of a spring suspension unit or a telescopic strut. The cylinder piston device of FIG. 1 is to be inserted into an outer container (not shown) of a spring suspension unit or a telescopic strut.

The cylinder piston device comprises a cylinder member 1. The cylinder member 1 is closed at its upper end (not shown) by a conventional piston rod sealing and guiding unit and at its lower end (not shown) by an also conventional bottom wall. The cylinder member 1 is surrounded by a tubular container (not shown). An annular space is defined in a conventional way between the cylinder member 1 and the tubular container.

A piston rod member 3 is inserted into the cylinder member 1 through the piston rod guiding and sealing unit. Within the cavity 20 defined within the cylinder member 1 there is provided a piston unit 2 at the inner end of the piston rod member 3. The piston unit 2 separates the cavity 20 into two working chambers 20a and 20b, the working chamber 20a being adjacent to the piston rod guiding and sealing unit and the working chamber 20b being adjacent the bottom wall.

The working chambers 20a and 20b are filled with an hydraulic liquid. This hydraulic liquid partially fills also the annular space between the cylinder member and the outer tubular container; the rest of the annular space being filled with a gas under atmospheric or superatmospheric pressure. The liquid in the lower working chamber 20b is connected with the liquid in the annular space by throttled bottom wall passage means passing through the bottom wall.

The piston unit 2 comprises a piston member 2a which may be of sintered material. The piston member 2a is provided with throttled fluid connection means 2b passing through the piston member 2a in substantially axial direction. The piston member 2a is provided with a piston ring supporting face 2c directed in the radial outward direction towards the inner circumferential surface 1a of the cylinder member 1. In an axially intermediate area of the piston ring supporting face 2c there is provided an annular recess 2d in the piston ring supporting face 2c.

A piston ring member 4 is provided on the piston ring supporting face 2c of the piston member 2a. The piston ring member 4 is provided with a radially inner circumferential face 4a and a radially outer circumferential face 4b. The radially inner circumferential face 4a of the piston ring member 4 is in contact with the piston ring supporting face 2c of the piston member 2a, whereas the radially outer circumferential face 4b of the piston ring member is in contact with the inner circumferential surface 1a of the cylinder member 1.

The piston ring member 4 is provided with a radially inward directed depression 6. The radial inner side of the annular depression 6 defines a radially inward directed projection 6a engaging the annular recess 2d of the piston member 2a; on the other hand the radially outward directed concave face 6b of the depression 6 accommodates a fastening ring 7, for example a split spring ring. The piston ring member 4 is made of a plastic material like polytetrafluorethylene. As can be seen from FIG. 1 the axial length of the piston ring member 4 is much greater than the radial thickness of the piston ring member 4. In the embodiment of FIG. 1 the axial length of the piston ring member 4 is more than 10 times as long as the radial thickness. The piston ring member 4 of FIG. 1 is closed in the circumferential direction and the radial depression 6 may be preshaped into the piston ring member 4 before the piston ring member 4 is mounted onto the piston member 2a. So when the piston ring member 4 is mounted onto the piston member 2a the projection 6a defined by the radial depression 6 snaps into the annular recess 2d of the piston member 2a. Thereupon the fastening ring 7 may be applied to the concave face 6b of the depression 6. When the cylinder piston device so far described is used for telescopic struts of vehicles transverse forces acting onto the wheel of the vehicle are to be transmitted between the cylinder member 1 and the piston rod member 3. These radial forces result in radial compression of the piston ring member 4 between the piston member 2a and the cylinder member 1. This means that the piston ring member 4 must not only consist of an anti-friction material but must also be capable of transmitting high pressures. Further the piston ring member 4 is subject to considerable temperature variation and must fulfill its sealing function under all operation temperatures to be expected. It is to be noted that the piston ring member 4 in FIG. 1 is free for axial expansion at both axial ends thereof. So the piston ring member 4 can expand under both increased temperature and increased radial compressional forces. Therefore no blocking of the piston unit with respect to the cylinder member is to be expected. On the other hand the piston ring member 4 can be dimensioned such that even under the lowest operational temperatures to be expected there is still a sufficient sealing action between the piston unit and the cylinder member 1 and substantially no radial motion of the piston unit with respect to the cylinder member.

It is to be noted that the depression 6 can also be shaped, when the piston ring member 4 has been mounted onto the piston member 2a. It is further to be noted that the split spring ring 7 is only a preferred and not a necessary feature.

Further it is to be noted that in FIG. 1 the piston ring member 4 can be made also from a metallic carrier member which is only coated on its radially outer face with an anti-friction layer, for example of plastic material. In such an embodiment the piston ring member may be provided with a substantially axial extending slot. The metallic reinforcing member may be prestressed in radial inward direction so that the depression 6 snaps into the recess 2d. No fastening ring 7 is necessary in this case.

Figure 2:
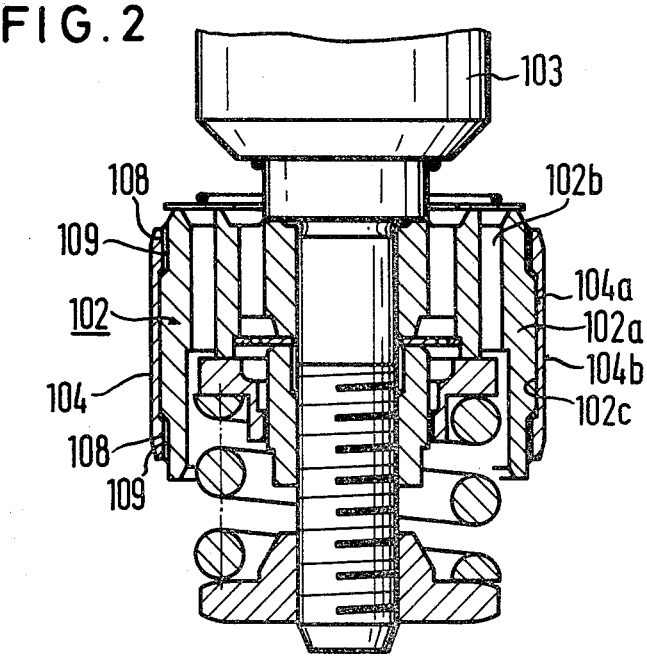
FIG. 2 is a sectional view of a second embodiment of a piston unit to be used in a cylinder piston device of this invention.

In the embodiment of FIG. 2 analogous parts are designated by the same reference numerals as in FIG. 1 increased by 100.

In FIG. 2 the piston member 102a is provided with annular recesses 109 at both axial ends of the piston ring member 104 is provided and the piston ring member 104 with radially inward directed projections 108 extending into the recesses 109, whereby the piston ring member 104 is fixed in the axial direction with respect to the piston member 102a. Also in this embodiment the piston ring member 104 may either be made fully of plastic material in which case it is preferably closed in circumferential direction; it may however also be made of a metallic carrier with an anti-friction layer only on the outer circumferential face 104b. In this case the metallic carrier is preferably split in axial direction. The projections 108 extend in radial direction beyond the radially inner circumferential face 104a only to a very small extent of for example less than 1 mm preferably less than 0.5 mm so that the mounting of a peripherally closed piston ring member 104 is facilitated. Nevertheless the projections 108 snap into the recesses 109 so that the piston ring member 104 is fixed in axial direction. As can be seen in FIG. 2 the radially inward surface of the projections 108 are spaced from the radially outward surface of the recesses 109 forming an annular gap therebetween.

The embodiment of FIG. 3 is similar to the embodiment of the FIG. 2. Analogous parts are designated by the same reference numerals as in FIG. 2, increased by 100.

In the embodiment of FIG. 3 the piston ring member 204 comprises a radially outer anti-friction layer 210. The outer circumferential face 204b is convex. The piston rod member 204 is split as indicated at 204d. This embodiment has the advantage that wedge shaped collecting spaces are defined between the convex face 204b and the inner circumferential surface of the cylinder. In these wedge-shaped collecting spaces lubricant can collect so that the anti-friction properties of this embodiment are enhanced.

The embodiment of FIGS. 4 and 5 is similar to the embodiment of FIG. 2; analogous parts are designated by the same reference numerals, increased by 200.

It is to be noted that the annular projections 108 of FIG. 2 have been replaced by circumferential sequences of projections 308. By this embodiment the mounting of a non-split piston ring member of plastic material can be facilitated without influence to the axial fixation of the piston ring member 304 with respect to the piston member 302a.

Figure 6:
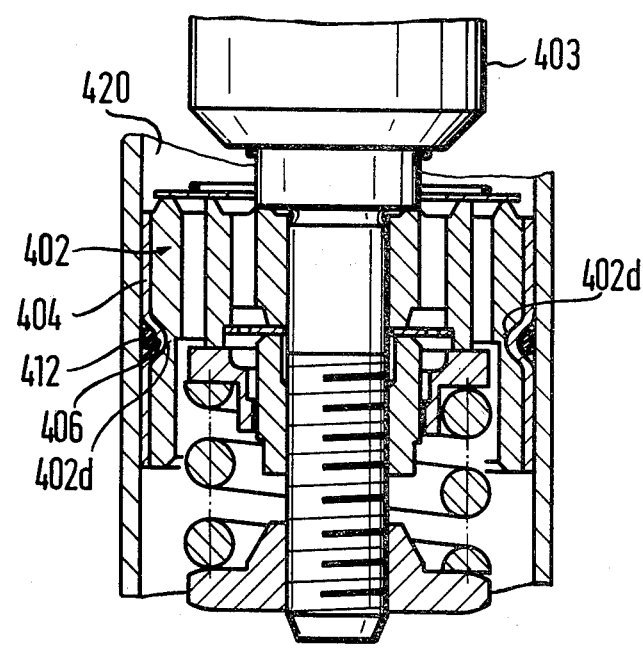
FIG. 6 is a further embodiment of a cylinder piston device of this invention.

The embodiment of FIG. 6 is different from the embodiment of FIG. 1 only in so far as the split spring ring 7 has been replaced by a sealing ring 412 of plastic material, which acts as an additional sealing element and presses the depression 406 into the annular recess 402d.

While specific embodiments of the invention have been shown and described in detail to illustrate the application of the inventive principles, it will be understood that the invention may be embodied otherwise without departing from such principles.

In particular it is to be noted that the features of the different embodiments of this invention can be combined.

The reference numerals in the claims are not to be understood in a restricted sense, but only for a better understanding.

The depression 6 of FIG. 1 can also be rolled into the recess 2d after the piston ring member has been mounted onto the piston member 2. The piston ring member can be made by sintering in all embodiments without substantial mechanical machining. This is especially true for the embodiments of FIGS. 2, 3 and 4.

What is claimed is:

1. A cylinder piston device comprising:
   (1) a cylinder member (1) having an axis and two ends and defining a cavity (20) therein;
   (2) a piston rod unit with a piston rod member (3) axially movable with respect to said cylinder member (1), a portion of said piston rod member (3) being housed within said cavity (20);
   (3) a piston unit (2) being fixed to said portion of said piston rod member (3) within said cavity (20);
      3.1 said piston unit (2) defining two working chambers (20a, 20b) within said cavity (20);
      3.2 said working chambers (20a, 20b) being interconnected by throttled fluid connection means (2b);
      3.3 said piston unit (2) being provided with a piston ring supporting face (2c) which is directed substantially in a radial outward direction towards an inner circumferential surface (1a) of said cylinder member (1);
      3.4 a piston ring member (4) with a radially inner circumferential face (4a) and a radially outer circumferential face (4b) being supported by its radially inner circumferential face (4a) on said piston ring supporting face (2c), and engaging by its radially outer circumferential face (4b) said inner circumferential surface (1a) of said cylinder member (1);
      3.5 said piston ring member (4) being axially fixed with respect to said piston unit (2);
   (4) a fluid being contained within said cavity (20); the improvement which consists in that said piston ring member (4) is provided with at least one radially inward directed projection (6a) extending in radially inward direction beyond said radially inner circumferential face (4a) of said piston ring member (4), said projection (6a) axially engaging a securing face (2d) of said piston unit (2) extending radially inward of said piston ring supporting face (2c), and said projection (6a) is defined by a radially inward directed depression (6) of said piston ring member (4).

2. A cylinder piston device comprising:
   (1) a cylinder member (1) having an axis and two ends and defining a cavity (20) therein;
   (2) a piston rod unit with a piston rod member (3) axially movable with respect to said cylinder member (1), a portion of said piston rod member (3) being housed within said cavity (20);
   (3) a piston unit (2) being fixed to said portion of said piston rod member (3) within said cavity (20);
      3.1 said piston unit (2) defining two working chambers (20a, 20b) within said cavity (20);
      3.2 said working chambers (20a, 20b) being interconnected by throttled fluid connection means (2b);
      3.3 said piston unit (2) being provided with a piston ring supporting face (2c) which is directed substantially in a radial outward direction towards an inner circumferential surface (1a) of said cylinder member (1);
      3.4 a piston ring member (4) with a radially inner circumferential face (4a) and a radially outer circumferential face (4b) being supported by its radially inner circumferential face (4a) on said piston ring supporting face (2c), and engaging by its radially outer circumferential face (4b) said inner circumferential surface (1a) of said cylinder member (1);
      3.5 said piston ring member (4) being axially fixed with respect to said piston unit (2);
   (4) a fluid being contained within said cavity (20); the improvement which consists in that said piston ring member (4) is provided with at least one radially inward directed projection (6a) extending in radially inward direction beyond said radially inner circumferential face (4a) of said piston ring member (4), said projection (6a) axially engaging a securing face (2d) of said piston unit (2) extending radially inward of said piston ring supporting face (2c), said recess (2d) is provided in an axially intermediate position between the axial ends of said piston ring member (4), said projection (6a) is defined by a radially inward directed depression (6) of said piston ring member (4), and said depression (6) is annular about said axis.

3. A cylinder piston device comprising:
   (1) a cylinder member (1) having an axis and two ends and defining a cavity (20) therein;
   (2) a piston rod unit with a piston rod member (3) axially movable with respect to said cylinder member (1), a portion of said piston rod member (3) being housed within said cavity (20);
   (3) a piston unit (2) being fixed to said portion of said piston rod member (3) within said cavity (20);
      3.1 said piston unit (2) defining two working chambers (20a, 20b) within said cavity (20);
      3.2 said working chambers (20a, 20b) being interconnected by throttled fluid connection means (2b);

3.3 said piston unit (2) being provided with a piston ring supporting face (2c) which is directed substantially in a radial outward direction towards an inner circumferential surface (1a) of said cylinder member (1);

3.4 a piston ring member (4) with a radially inner circumferential face (4a) and a radially outer circumferential face (4b) being supported by its radially inner circumferential face (4a) on said piston ring supporting face (2c), and engaging by its radially outer circumferential face (4b) said inner circumferential surface (1a) of said cylinder member (1);

3.5 said piston ring member (4) being axially fixed with respect to said piston unit (2);

(4) a fluid being contained within said cavity (20); the improvement which consists in that said piston ring member (4) is provided with at least one radially inward directed projection (6a) extending in radially inward direction beyond said radially inner circumferential face (4a) of said piston ring member (4), said projection (6a) axially engaging a securing face (2d) of said piston unit (2) extending radially inward of said piston ring supporting face (2c), said projection (6a) is defined by a radially inward directed depression (6) of said piston ring member (4) said depression (6) is annular about said axis, and said annular depression defines a concave radially outer face (6b), said concave radially outer face accommodating a fastening ring (7).

4. A cylinder piston device as set forth in claim 1, 2 or 3 wherein said piston ring supporting face (2c) is provided with at least one recess (2d) receiving said at least one projection (6a).

5. A cylinder piston device as set forth in claim 4 wherein said recess (2d) is an annular recess about said axis.

6. A cylinder piston device as set forth in claim 1, 2 or 3, wherein said projection (6a) is an annular projection around said axis.

7. A cylinder piston device as set forth in claim 1, 2 or 3, wherein said recess (2d) is provided in an axially intermediate position between the axial ends of said piston ring member (4).

8. A cylinder piston device as set forth in claim 3, wherein said fastening ring (7) is a split spring ring.

9. A cylinder piston device comprising:

(1) a cylinder member (1) having an axis and two ends and defining a cavity (20) therein;

(2) a piston rod unit with a piston rod member (3) axially movable with respect to said cylinder member (1), a portion of said piston rod member (3) being housed within said cavity (20);

(3) a piston unit (2) being fixed to said portion of said piston rod member (3) within said cavity (20);

3.1 said piston unit (2) defining two working chambers (20a, 20b) within said cavity (20);

3.2 said working chambers (20a, 20b) being interconnected by throttled fluid connection means (2b);

3.3 said piston unit (2) being provided with a piston ring supporting face (2c) which is directed substantially in a radial outward direction towards an inner circumferential surface (1a) of said cylinder member (1);

3.4 a piston ring member (4) with a radially inner circumferential face (4a) and a radially outer circumferential face (4b) being supported by its radially inner circumferential face (4a) on said piston ring supporting face (2c), and engaging by its radially outer circumferential face (4b) said inner circumferential surface (1a) of said cylinder member (1);

3.5 said piston ring member (4) being axially fixed with respect to said piston unit (2);

(4) a fluid being contained within said cavity (20); the improvement which consists in that said piston ring member (4) is provided with at least one radially inward directed projection (6a) extending in radially inward direction beyond said radially inner circumferential face (4a) of said piston ring member (4), said projection (6a) axially engaging a securing face (2d) of said piston unit (2) extending radially inward of said piston ring supporting face (2c), said recess (2d) is provided in an axially intermediate position between the axial ends of said piston ring member (4), said projection (6a) is defined by a radially inward directed depression (6) of said piston ring member (4), said depression (6) is annular about said axis, and said annular depression (6) defines a concave radially outer depression face (6b), said concave radially outer depression face accommodating an antifriction ring (7) of plastic material.

10. A cylinder piston device comprising:

(1) a cylinder member (1) having an axis and two ends and defining a cavity (20) therein;

(2) a piston rod unit with a piston rod member (3) axially movable with respect to said cylinder member (1), a portion of said piston rod member (3) being housed within said cavity (20);

(3) a piston unit (2) being fixed to said portion of said piston rod member (3) within said cavity (20);

3.1 said piston unit (2) defining two working chambers (20a, 20b) within said cavity (20);

3.2 said working chambers (20a, 20b) being interconnected by throttled fluid connection means (2b);

3.3 said piston unit (2) being provided with a piston ring supporting face (2c) which is directed substantially in a radial outward direction towards an inner circumferential surface (1a) of said cylinder member (1);

3.4 a piston ring member (4) with a radially inner circumferential face (4a) and a radially outer circumferential face (4b) being supported by its radially inner circumferential face (4a) on said piston ring supporting face (2c), and engaging by its radially outer circumferential face (4b) said inner circumferential surface (1a) of said cylinder member (1);

3.5 said piston ring member (4) being axially fixed with respect to said piston unit (2);

(4) a fluid being contained within said cavity (20); the improvement which consists in that said piston ring member (4) is provided with at least one radially inward directed projection (6a) extending in radially inward direction beyond said radially inner circumferential face (4a) of said piston ring member (4), said projection (6a) axially engaging a securing face (2d) of said piston unit (2) extending radially inward of said piston ring supporting face (2c), said recess (2d) is provided in an axially intermediate position between the axial ends of said piston ring member (4), said projection (6a) is defined by a radially inward directed depression (6)

of said piston ring member (4), said piston ring member (4) is fixed onto said piston unit (2) by said projection (6a) snapping behind said securing face (2d).

11. A cylinder piston device comprising:
(1) a cylinder member (1) having an axis and two ends and defining a cavity (20) therein;
(2) a piston rod unit with a piston rod member (3) axially movable with respect to said cylinder member (1), a portion of said piston rod member (3) being housed within said cavity (20);
(3) a piston unit (2) being fixed to said portion of said piston rod member (3) within said cavity (20);
   3.1 said piston unit (2) defining two working chambers (20, 20b) within said cavity (20);
   3.2 said working chambers (20a, 20b) being interconnected by throttled fluid connection means (2b);
   3.3 said piston unit (2) being provided with a piston ring supporting face (2c) which is directed substantially in a radial outward direction towards an inner circumferential surface (1a) of said cylinder member (1);
   3.4 a piston ring member (4) with a radially inner circumferential face (4a) and a radially outer circumferential face (4b) being supported by its radially inner circumferential face (4a) on said piston ring supporting face (2c), and engaging by its radially outer circumferential face (4b) said inner circumferential surface (1a) of said cylinder member (1);
   3.5 said piston ring member (4) being axially fixed with respect to said piston unit (2);
(4) a fluid being contained within said cavity (20); the improvement which consists in that said piston ring member (14) is provided with at least one radially inward directed projection (6a) extending in radially inward direction beyond said radially inner circumferential face (4a) of said piston ring member (4), said projection (6a) axially engaging a securing face (2d) of said piston unit (2) extending radially inward of said piston ring supporting face (2c), said recess (2d) is provided in an axially intermediate position between the axial ends of said piston ring member (4), said projection (6a) is defined by a radially inward directed depression (6) of said piston ring member (4), said depression (6) is annular about said axis, and the axial length of said piston ring member (4) at least five times the radial thickness thereof.

12. A cylinder piston device comprising:
(1) a cylinder member (1) having an axis and two ends and defining a cavity (20) therein;
(2) a piston rod unit with a piston rod member (3) axially movable with respect to said cylinder member (1), a portion of said piston rod member (3) being housed within said cavity (20);
(3) a piston unit (2) being fixed to said portion of said piston rod member (3) within said cavity (20);
   3.1 said piston unit (2) defining two working chambers (20a, 20b) within said cavity (20);
   3.2 said working chambers (20a, 20b) being interconnected by throttled fluid connection means (2b);
   3.3 said piston unit (2) being provided with a piston ring supporting face (2c) which is directed substantially in a radial outward direction towards an inner circumferential surface (1a) of said cylinder member (1);
   3.4 a piston ring member (4) with a radially inner circumferential face (4a) and a radially outer circumferential face (4b) being supported by its radially inner circumferential face (4a) on said piston ring supporting face (2c), and engaging by its radially outer circumferential face (4b) said inner circumferential surface (1a) of said cylinder member (1);
   3.5 said piston ring member (4) being axially fixed with respect to said piston unit (2);
(4) a fluid being contained within said cavity (20); the improvement which consists in that said piston ring member (4) is provided with at least one radially inward directed projection (6a) extending in radially inward direction beyond said radially inner circumferential face (4a) of said piston ring member (4), said projection (6a) axially engaging a securing face (2d) of said piston unit (2) extending radially inward of said piston ring supporting face (2c), radially inwardly directed projections (108) are provided at both axial ends of said piston ring member (104), said radially inward directed projections (108) are recesses (109) at both axial ends of said piston ring supporting face (102c), said recesses (109) being open in the axial direction at or adjacent the respective ends of the piston unit (102), said recesses (109) are annular about said axis, said piston ring member (4) is fixed onto said piston unit (2) by said projection (6a) snapping behind said securing face (2d), said piston ring (4) is circumferentially closed, the axial length of said piston ring member (4) is at least five times the radial thickness thereof, the radial extend of said projection (108) beyond said radially inner circumferential face (104a) of said piston ring member (104) is less than 1 mm (1/25 inch).

13. In a cylinder piston device comprising:
(1) a cylinder member (1) having an axis and two ends and defining a cavity (20) therein;
(2) a piston rod unit with a piston rod member (3) axially movable with respect to said cylinder member (1), a portion of said piston rod member (3) being housed within said cavity (20);
(3) a piston unit (2) being fixed to said portion of said piston rod member (3) within said cavaity (20);
   3.1 said piston unit (2) defining two working chambers (20a, 20b) within said cavity (20);
   3.2 said working chambers (20a, 20b) being interconnected by throttled fluid connection means (2b);
   3.3 said piston unit (2) being provided with an axially extending piston ring supporting face (2c ) which is directed substantially in a radially outward direction towards an inner circumferential surface (1a) of said cylinder member (1);
   3.4 a piston ring member (4) with a radially inner circumferential face (4a) and a radially outer circumferential face (4b) being supported by its radially inner circumferential face (4a) on said piston ring supporting face (2c), and engaging by its radially outer circumferential face (4b) said inner circumferential surface (1a) of said cylinder member (1);
   3.5 said piston ring member (4) being axially fixed with respect to said piston unit (2);

(4) a fluid being contained with said cavity (20); the improvement which consists in that said piston ring member (4) is provided with at least one radially inwardly directed projection (108) at each of its axial ends, said piston ring supporting face having a pair of ends spaced apart in the axial direction, an annular recess at each of said ends of said piston ring supporting face, each of said radially inwardly directed projections (108) being received in a different one of said annular recesses, each of said recesses (109) having a substantially radially directed bottom face and one side face adjacent the respective end of said piston ring supporting face (102c) and being axially open toward the respective axial end of said piston unit (102), said projection (108) being in snapping engagement with said annular recess (109), and each of said bottom faces being in spaced relation to the radially inner surface of the corresponding said projection forming therebetween a gap with said gaps being open in the axial direction away from the corresponding said side face of said recess.

14. A cylinder piston device as set forth in claim 13, wherein a plurality of projections (308) are distributed along the circumference of the piston ring member (304) at both axial ends thereof.

15. A cylinder piston device as set forth in claim 1, wherein said depression (6) is preshaped before mounting said piston ring member (4) onto said piston unit (2).

16. A cylinder piston device as claimed in claim 1, wherein said radially inward directed depression (6) is shaped after said piston ring member (4) has been mounted onto said piston unit (2).

17. A cylinder piston device as set forth in claim 1, 2, 3, 10 or 13, wherein said piston ring (204) is split.

18. A cylinder piston device as set forth in claim 1, 2, 3, 10 or 13, wherein said piston ring (4) is circumferentially closed.

19. A cylinder piston device as set forth in claim 1, 2, 3, 10 or 13, wherein said piston ring (4) is made of plastic material like polytetrafluorethylene.

20. A cylinder piston device as set forth in claim 1, 2, 3, 10 or 13, wherein said piston ring member (204) comprises a carrier member and an anti-friction lining (210) on its radially outer circumferential face.

21. A cylinder piston device as set forth in claim 13, wherein said radially outer circumferential face (204b) is convex towards said inner circumferential face of said cylinder member.

22. A cylinder piston device as set forth in claim 1, 2, 3, 10 or 13, wherein the axial length of said piston ring member (4) is at least twice the radial thickness of said piston ring member (4).

23. A cylinder piston device as set forth in claim 11, wherein the axial length of said piston ring member (4) is at least ten times the radial thickness thereof.

24. A cylinder piston device as set forth in claim 12, wherein the radial extent of said projection (108) beyond said radially inner circumferential face (104a) of said piston ring member (104) is less than 0.5 mm (1/50 inch).

25. A cylinder piston device as set forth in claim 1, 2, 3, 10, 11, 12 or 13, wherein at least one axial end of said piston ring member (4) is free for axial expansion.

26. A cylinder piston device as set forth in claim 12, wherein each said recess has a substantially radially directed bottom face and one side face adjacent to and spaced from the adjacent end of said piston ring supporting face, and said side face being bevelled and extending at an acute angle outwardly from said bottom face and away from the adjacent end of said piston ring supporting face.

* * * * *